US005828075A

United States Patent [19]

Siler et al.

[11] Patent Number: 5,828,075

[45] **Date of Patent: *Oct. 27, 1998**

[54] APPARATUS FOR SCANNING COLORED REGISTRATION MARKS

[75] Inventors: Steven J. Siler, Cary; Scott T. Hilkert, Skokie; Jeffrey C. Petrin, Arlington Heights, all of Ill.

[73] Assignee: Hurletron, Incorporated, Danville, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 728,700

[22] Filed: Oct. 11, 1996

[51] Int. Cl.[6] .................... G01N 21/86

[52] U.S. Cl. .................... 250/259.44; 356/429

[58] Field of Search .................... 250/559.44, 559.01; 356/429

[56] References Cited

U.S. PATENT DOCUMENTS

| | | | |
|---|---|---|---|
| 1,151,461 | 8/1915 | Hatt . | |
| 3,073,997 | 1/1963 | Tagliasacchi | 318/85 |
| 3,468,201 | 9/1969 | Adamson et al. | 83/74 |
| 3,561,654 | 2/1971 | Greiner | 226/25 |
| 3,601,587 | 8/1971 | Thiede | 235/92 CC |
| 3,915,090 | 10/1975 | Horst et al. | 101/426 |
| 3,963,902 | 6/1976 | Dowd | 235/92 MP |
| 3,974,766 | 8/1976 | Zimmer | 101/129 |
| 3,998,156 | 12/1976 | Zimmer | 101/115 |
| 4,033,259 | 7/1977 | Schuhmann | 101/174 |
| 4,135,664 | 1/1979 | Resh . | |
| 4,164,184 | 8/1979 | Vertegaal | 101/127.1 |
| 4,165,465 | 8/1979 | Kanatani et al. | 250/559 |
| 4,243,925 | 1/1981 | Gnuechtel | 318/603 |
| 4,349,880 | 9/1982 | Southgate et al. | 364/507 |
| 4,366,542 | 12/1982 | Anselrode | 364/469 |
| 4,366,753 | 1/1983 | Glanz et al. | 101/181 |
| 4,391,190 | 7/1983 | Metzler | 101/211 |
| 4,437,402 | 3/1984 | Fischer | 101/181 |
| 4,484,522 | 11/1984 | Simeth | 101/248 |
| 4,485,447 | 11/1984 | Ericsson | 364/469 |
| 4,495,582 | 1/1985 | Dessert et al. | 364/469 |
| 4,531,828 | 7/1985 | Hoshino | 355/3 SH |

(List continued on next page.)

FOREIGN PATENT DOCUMENTS

| | | |
|---|---|---|
| 0 311 729 | 4/1989 | European Pat. Off. . |
| 27 02 274 | 7/1978 | Germany . |
| 56-28864 | 3/1981 | Japan . |
| 7808954 | 3/1980 | Netherlands . |
| 499198 | 3/1976 | Russian Federation . |
| 2 024 457 | 1/1980 | United Kingdom . |

OTHER PUBLICATIONS

Hurletron Incorporated Drawing No. 309704, 1 sheet, dated Apr. 22, 1993.

Hurletron Incorporated Drawing No. 405876, 1 sheet, dated Nov. 26, 1990.

*Primary Examiner*—Stephone B. Allen
*Attorney, Agent, or Firm*—Marshall, O'Toole, Gerstein, Murray & Borun

[57] ABSTRACT

An apparatus for scanning colored registration marks printed on a moving web by a plurality of printing cylinders of a printing press is provided with a photoemitter for generating a beam of light directed at the moving web, a detector for detecting the amount of light reflected from the moving web and generating a reflectance signal having a magnitude relating to the amount of light, an A/D converter for periodically sampling the reflectance signal to generate a number of scan values, a memory for storing the scan values, and a baseline generator for determining a baseline level of the reflectance signal. The baseline generator may include means for assigning each of the scan values to one of a plurality of predetermined ranges of values based on the magnitudes of the scan values, means for determining a baseline range from the plurality of the predetermined ranges based on the range having the largest number of the scan values, and means for determining the baseline level based upon the baseline range. The predetermined ranges may be overlapping ranges.

28 Claims, 4 Drawing Sheets

U.S. PATENT DOCUMENTS

| | | | |
|---|---|---|---|
| 4,553,478 | 11/1985 | Greiner et al. | 101/426 |
| 4,685,139 | 8/1987 | Masuda et al. | 382/1 |
| 4,694,749 | 9/1987 | Takeuchi et al. | 101/426 |
| 4,743,768 | 5/1988 | Watanabe | 250/556 |
| 4,805,111 | 2/1989 | Steidel | 364/469 |
| 4,872,407 | 10/1989 | Banke | 101/389.1 |
| 5,020,006 | 5/1991 | Sporon-Fiedler | 364/550 |
| 5,056,430 | 10/1991 | Bayerlein et al. | 101/211 |
| 5,179,897 | 1/1993 | Liebregts | 101/129 |
| 5,209,161 | 5/1993 | Derivi et al. | 101/211 |
| 5,252,838 | 10/1993 | Timblin | 250/561 |
| 5,272,980 | 12/1993 | Takeuchi et al. | 101/481 |
| 5,455,764 | 10/1995 | Meihofer | 364/161 |
| 5,551,339 | 9/1996 | Schadlich et al. | 101/216 |
| 5,649,484 | 7/1997 | Broghammer et al. | 101/248 |

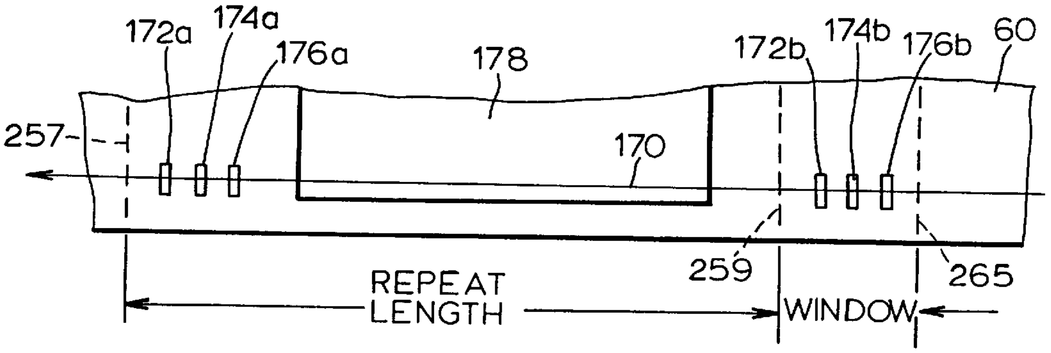
FIG. 3
| INDEX | VALUE |
|---|---|
| 1 | 114 |
| 2 | 117 |
| 3 | 115 |
| 4 | 87 |
| 5 | 87 |
| 6 | 114 |
FIG. 5A
| INDEX | VALUE |
|---|---|
| 1 | 114 |
| 2 | 114 |
| 3 | 115 |
| 4 | 115 |
| 5 | 87 |
| 6 | 87 |
FIG. 5B
| RANGE | # VALUES |
|---|---|
| 75-84 | 0 |
| 80-89 | 2 |
| 85-94 | 0 |
| 90-99 | 4 |
| 95-104 | 12 |
| 100-109 | 3 |
FIG. 7
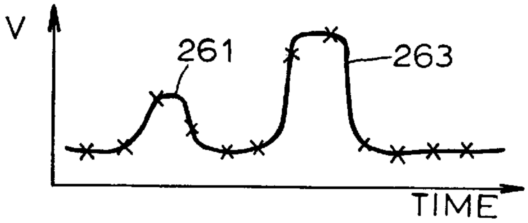
FIG. 6
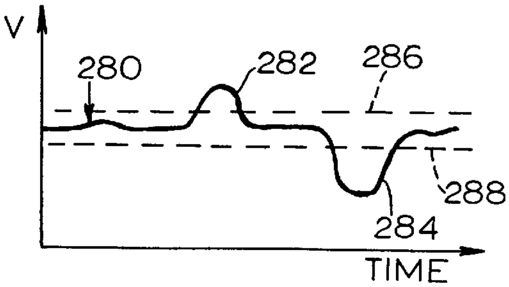
FIG. 8

APPARATUS FOR SCANNING COLORED REGISTRATION MARKS

BACKGROUND OF THE INVENTION

The present invention is directed to an apparatus for scanning colored registration marks printed on a web by a multi-color printing press having a separate printing station for printing each of a plurality of colors.

Color printing presses are typically provided with at least four print stations through which a web, such as paper, sequentially passes. Each printing station includes a rotating printing cylinder that prints an image in a single color on the paper. The images printed by the printing cylinders must be properly aligned or registered so that each single-color image precisely overlays the other single-color images to form the desired multi-color image. To maintain proper alignment of the images, each printing cylinder must be maintained in a proper angular orientation with respect to the other printing cylinders.

Conventional printing presses include dynamic registration systems which maintain the proper registration of the printing cylinders during printing by detecting the relative position of a plurality of registration marks printed on the moving web in different colors, each registration mark being printed by one the printing cylinders. Any error in registration of the printing cylinders is determined by detecting a variation in the relative position of the registration marks on the web.

A prior art scanner has been used to detect different colored registration marks printed by the printing cylinders of a printing press. The prior art scanner directed a beam of light at the moving web on which the registration marks were printed and detected light reflected from the moving web. The scanner generated an analog reflectance signal having a magnitude based on the amount of reflected light. Since different colors reflect different amounts of light, the presence of a registration mark printed in a color different than the color of the paper web is detectable by detecting a change in magnitude of the reflectance signal.

SUMMARY OF THE INVENTION

The invention is directed to an apparatus for scanning colored registration marks printed on a moving web, such as those printed by a plurality of printing cylinders of a printing press. In one form of the invention, the apparatus includes a photoemitter for generating a beam of light directed at the moving web, a detector for detecting the amount of light reflected from the moving web and generating a reflectance signal having a magnitude relating to the amount of light, means for periodically sampling the reflectance signal to generate a number of scan values, memory means for storing the scan values, and means for determining a baseline level of the reflectance signal.

The means for determining a baseline level may include means for assigning each of the scan values to one of a plurality of predetermined ranges of values based on the magnitudes of the scan values, means for determining a baseline range from the plurality of the predetermined ranges based on the range having the largest number of the scan values, and means for determining the baseline level based upon the baseline range. The predetermined ranges may be overlapping ranges.

The apparatus may also include means for comparing the normalized reflectance signal with a threshold signal based upon the baseline level and generating at least one detect signal indicating detection of one of the registration marks printed on the moving web.

In another form, the invention is directed to a scanning apparatus having a photoemitter for generating a beam of light directed at the moving web, a detector for detecting the amount of light reflected from the web and generating a reflectance signal having a magnitude relating to the amount of light, a signal conditioning circuit, such as a variable gain amplifier or level shift circuit, for changing a parameter of the reflectance signal, means for periodically sampling the reflectance signal to generate a number of scan values, memory means for storing the scan values, and control means for controllably adjusting the parameter of the reflectance signal based upon the scan values.

The control means may include means for controllably adjusting the signal conditioning circuit so that the reflectance signal is converted to a normalized reflectance signal having a predetermined signal range with a predetermined minimum value and a predetermined maximum value. The control means may also include means for controllably adjusting the parameter of the reflectance signal based upon the scan value having the minimum value and the scan value having the maximum value.

The sampling means may comprise means for periodically sampling the reflectance signal for a duration corresponding to a length of the moving web which is at least as large as the printing cylinder circumference, and the sampling rate of the sampling means may be high enough to obtain reflectance data relating to one of the registration marks printed on the web.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 3 is an illustration of a plurality of different colored registration marks printed on a web during operation of the printing press;

FIGS. 5A and 5B illustrate portions of an indexed buffer using for storing scan values;

FIG. 6 illustrates the rate at which a reflectance signal is sampled;

FIG. 7 illustrates the assignment of scan values to a plurality of different ranges of values; and FIG. 8 illustrates a reflectance signal in relation to a pair of thresholds.

DETAILED DESCRIPTION OF A PREFERRED EMBODIMENT

Figure 1:
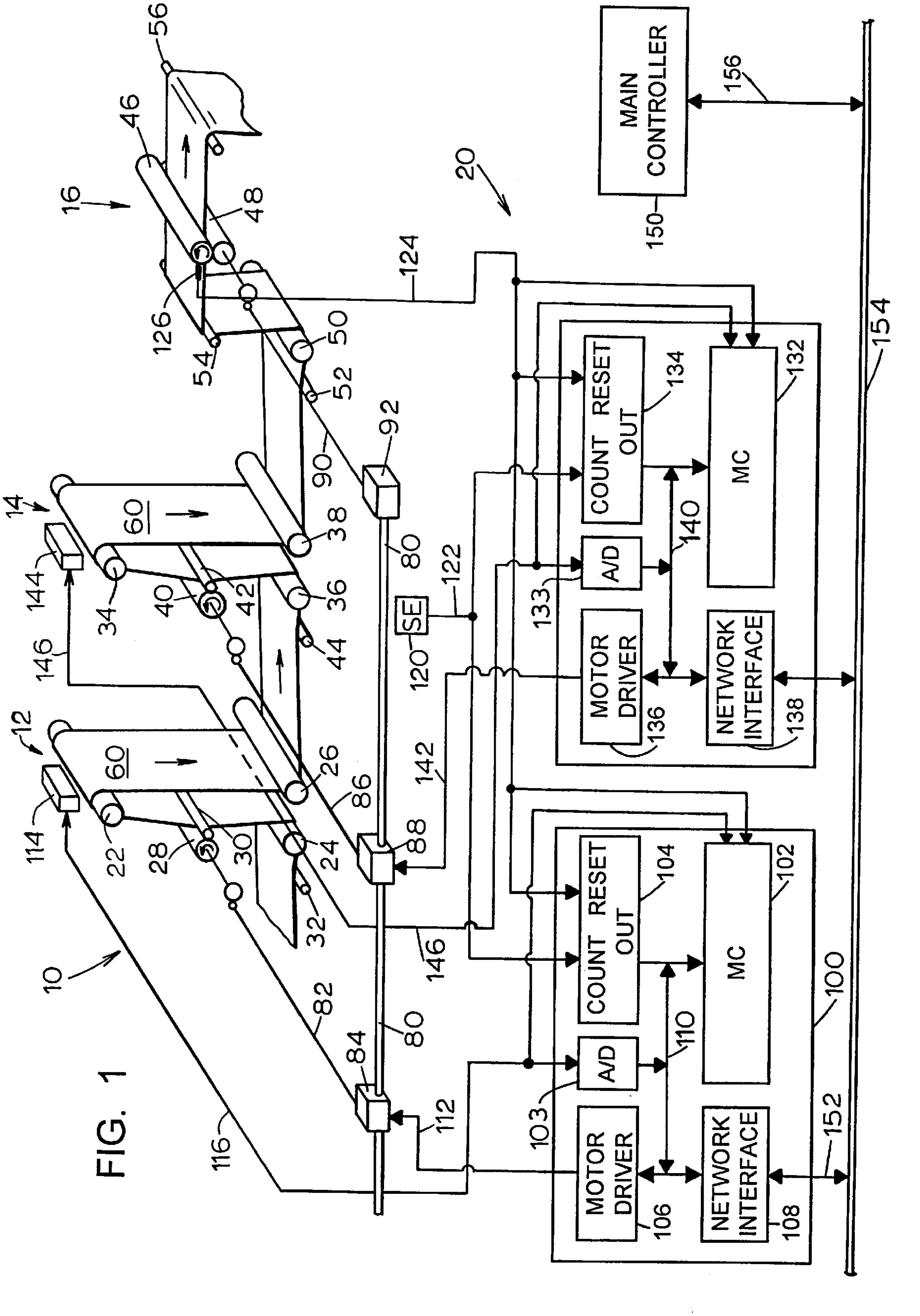
FIG. 1 illustrates a printing press having an apparatus for scanning colored registration marks printed by the press.

FIG. 1 illustrates a printing press 10 having an apparatus for scanning colored registration marks printed during operation of the press 10. The relative positions of the printed registration marks are used to dynamically register the printing cylinders of the press 10 in a conventional manner.

Referring to FIG. 1, the printing press 10 includes a first printing station 12, a second printing station 14, and a cutting station 16. The first printing station 12 includes an upper pull roller 22, a pair of guide rollers 24, 26, a printing cylinder 28, and two rollers 30, 32. The second printing station 14 also includes an upper pull roller 34, a pair of guide rollers 36, 38, a printing cylinder 40, and two rollers 42, 44. The cutting station 16 includes a die cut cylinder 46, a die anvil cylinder 48, a guide roller 50, and three rollers 52, 54, 56. The particular structure of the printing press 10 described above is not considered important to the invention, and the press 10 may have other configurations.

A portion of a web 60, such as a paper web, is shown to pass successively from the first printing station 12, to the second printing station 14, and to the cutting station 16 in the direction indicated by the arrows. During normal printing operation, as the web 60 passes through the first printing station 12, images in a first color are printed on the web 60 by the printing cylinder 28. As the web 60 passes through the second printing station 14, images in a second color are printed on the web 60 by the printing cylinder 40 in alignment or registration with the images previously printed by the cylinder 28. As the web 60 passes through the cutting station 16, a cut or pattern of cuts is made in the web 60 by the die cut cylinder 46, the cut or pattern of cuts being in precise alignment with the multi-color image previously printed on the web 60.

It should be understood that while only two printing stations are shown, a multi-color printing press typically has at least four printing stations, each of which prints images on the web 60 in a different color.

Depending on the type of printing press 10, each printing cylinder 28, 40 may have a printing plate (not shown) mounted thereon. Each printing plate has an area in which printing elements are formed so that a desired image is printed on the web 60. Where the printing press 10 is a flexo-graphic press, the printing elements constitute raised areas (e.g. raised 1/16 of an inch with respect to the outer surface of the plate 62) which are inked once per revolution of the cylinder 28, with the image printed on the web 60 corresponding to the pattern of raised areas on the printing plate. Where the printing press 10 is a conventional web-offset press, the printing elements constitute ink-attracting areas on the surface of the printing plate which form the desired image.

Where the printing press 10 is a gravure press, 110 printing plate is used, but instead the printing elements constitute very small recesses referred to as "gravure cells" formed in a metal coating applied to the printing cylinder 28. The gravure cells are filled with a particular color of ink upon each revolution of the cylinder 28, and the ink contained in the gravure cells is transferred to the web 60 as the web 60 makes contact with the printing cylinder 28.

Each printing plate or printing cylinder has an area which is used to print a colored registration mark on the web 60. The area may consist of a relatively small number of the type of printing elements, as described above, which are provided on the printing plate or printing cylinder.

The printing cylinder 28 of the first printing station 12 is rotatably driven by a main drive shaft 80 operatively coupled to the printing cylinder 28 through a secondary drive shaft 82 and a phase control unit 84 for controlling the angular relationship or phase between the main drive shaft 80 and the secondary drive shaft 82. Similarly, the printing cylinder 40 of the second printing station 14 is rotatably driven, at the same rotational rate as the printing cylinder 28, via a secondary drive shaft 86 coupled to the main drive shaft 80 via a phase control unit 88.

The die anvil cylinder 48 is rotatably driven at the same rotational rate as the printing cylinders 28, 40 via a secondary drive shaft 90 connected to a phase control unit 92. The die anvil cylinder 48 and the die cut cylinder 46 are interconnected by a gearing system (not shown) which causes the die cut cylinder 46 to be driven at the same rate as the die anvil cylinder 48.

The angular position of the printing cylinder 28 of the first printing station 12 may be controllably adjusted relative to the angular position of the die cut cylinder 46 via a printing station controller 100 operatively connected to the first printing station 12. The station controller 100 includes a microcontroller (MC) 102, an analog-to-digital (A/D) converter 103, a counter 104, a motor driver circuit 106, and a network interface circuit 108, all of which are interconnected via an internal address/data link 110. The microcontroller 102 incorporates conventional hardware elements (not shown) including a memory for storing a computer program and a microprocessor for executing the program.

The motor driver circuit 106 is coupled to the phase control unit 84 via a multi-signal line 112 on which a number of motor drive signals are generated. The motor drive signals drive a motor (not shown) in the phase control unit 84 that varies the angular position or phase of the secondary drive shaft 82 relative to the main drive shaft 80.

The microcontroller 102 and the A/D converter 103 are connected to a scanner 114 via a bi-directional data link 116 which includes a number of signal lines. The scanner 114 scans the printed web 60 to detect the colored registration mark printed by the printing cylinder 28 and the colored registration marks that were previously printed by other printing cylinders in the press 10. The scanner 114, which is described in detail below, generates an analog reflectance signal based on the amount of reflected light it detects and continuously transmits the reflectance signal to the A/D converter 103, which periodically samples the value of the reflectance signal to generate a plurality of scan values.

The counter 104 has a count input which is connected to a shaft encoder (SE) sensor 120 operatively coupled to the main drive shaft 80 via a line 122. When the main drive shaft 80 is in motion, the shaft encoder sensor 120 generates a large number of pulses on the line 122 corresponding to the rotation of the drive shaft 80. The number of pulses, which are counted by the counter 104, correspond to a predetermined increment of web movement. For example, the shaft encoder 120 may be designed to generate 1,000 pulses per inch of movement of the web 60.

The microcontroller 102 and the reset input of the counter 104 are both connected to receive via a line 124 a reset signal generated by a sensor 126 that detects the passage of a raised metal reference mark on the die cut cylinder 46. Since there is only one reference mark on the die cut cylinder 46, one reset signal is generated for each revolution of the die cut cylinder 46.

The angular position of the printing cylinder 40 of the second printing station 14 may be controllably adjusted relative to the angular position of the die cut cylinder 46 via a printing station controller 130 operatively connected to the second printing station 14. The station controller 130 includes a microcontroller 132, an A/D converter 133, a counter 134, a motor driver circuit 136, and a network interface circuit 138, all of which are interconnected via an internal address/data link 140. The microcontroller 132 incorporates conventional hardware elements (not shown) including a memory for storing a computer program and a microprocessor for executing the program.

The motor driver circuit 136 is coupled to the phase control unit 88 via a multi-signal line 142 on which a number of motor drive signals are generated. The motor drive signals drive a motor (not shown) in the phase control unit 88 that varies the angular position of the secondary drive shaft 86 relative to the main drive shaft 80.

The A/D converter 133 is connected to receive an analog signal from a scanner 144 via a data link 146. Like the scanner 114, the scanner 144 scans the printed web 60 to detect the colored registration mark printed by the printing cylinder 40 and, optionally, the colored registration marks that were previously printed by other printing cylinders in the press 10. The scanner 144 generates an analog reflectance signal and continuously transmits the reflectance signal to the A/D converter 133, which periodically samples the value of the reflectance signal to generate a plurality of scan values.

The count input of the counter 134 is connected to count the pulses generated by the shaft encoder sensor 120, as described above, and the microcontroller 132 and the reset input of the counter 134 are both connected to receive the reset signal generated by the sensor 126.

The station controller 100 is connected to a main controller 150 via a data link 152 connected to the network interface 108, a communication link 154 connected to the data link 152, and a data link 156 connected between the communication link 154 and the main controller 150. The station controller 130 is connected to the main controller 150 via a data link 158, the communication link 154, and the data link 156. The communication protocol between the main controller 150 and the station controllers 100, 130 may be a conventional one, such as an Ethernet-based communication protocol.

The main controller 150 may comprise a conventional personal computer having a microprocessor, a random access memory, a read-only memory, an input/output circuit, all of which are interconnected by an address/data bus in a conventional manner. The main controller 150 may also include a display device for displaying information to the press operator and an input device, such as a keyboard or mouse, for receiving commands from the operator, the display and input devices being connected to the input/output circuit of the main controller 150 via separate data lines.

Figure 2:
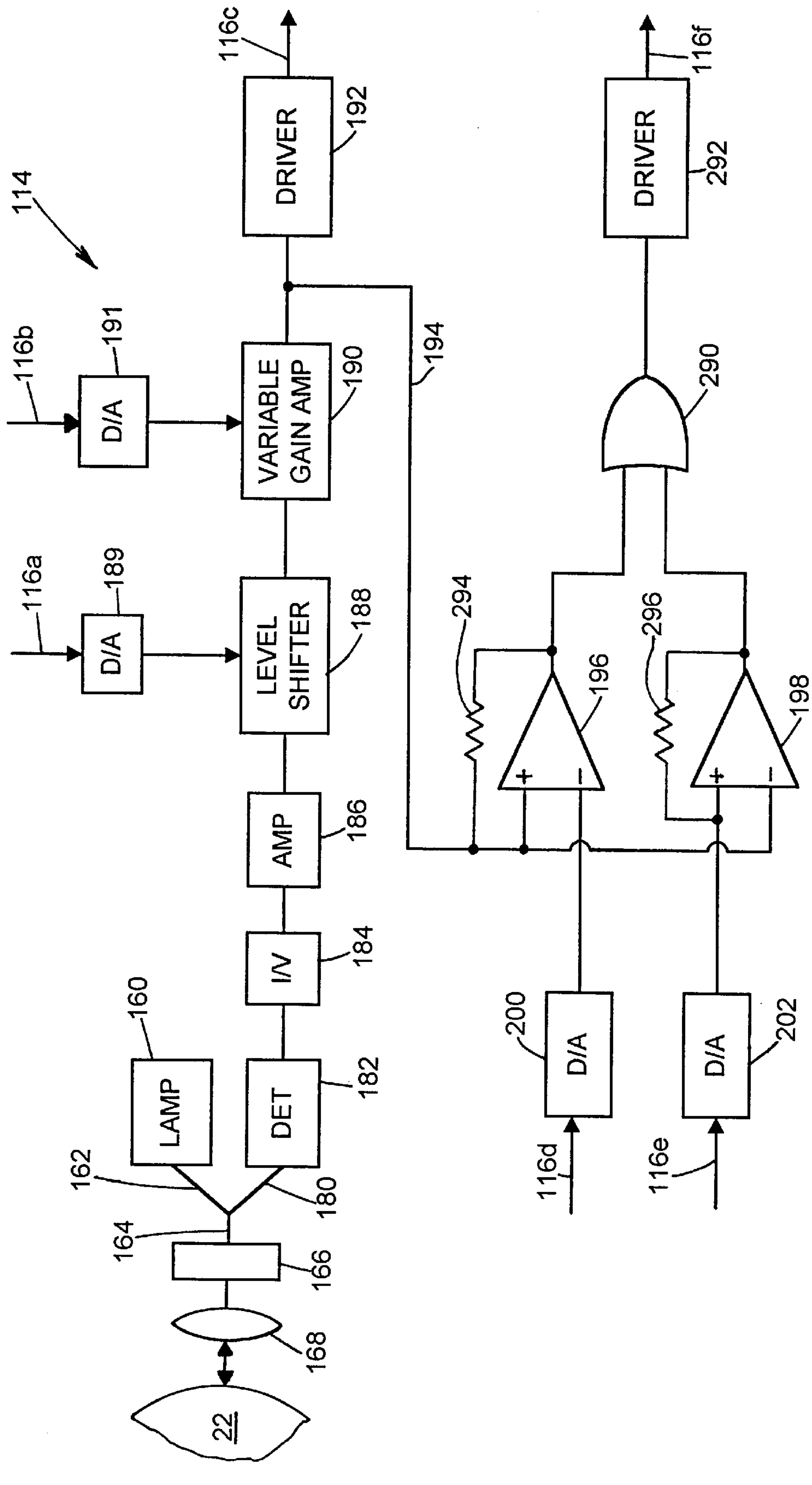
FIG. 2 is a block diagram of the scanner shown schematically in FIG. 1.

FIG. 2 illustrates a block diagram of the scanner 114 schematically shown in FIG. 1. Referring to FIG. 2, the scanner 114 (which is identical to the scanner 144) has a photoemitter in the form of a lamp 160 that emits light into a branch 162 of a Y-shaped fiber optical cable. The branch 162 transmits the light into a main branch 164 of the cable, where the light passes through a conventional filter 166 and a converging lens 168, which focuses the light at a point along a scanning path on the portion of the moving web 60 supported by the roller 22. Preferably, the focal point of the lens 168 coincides with the surface of the moving web 60.

Referring to FIG. 3, the scanning path is represented by an arrow 170 that passes through a plurality of colored registration marks 172*a*, 174*a*, 176*a*, 172*b*, 174*b*, 176*b* printed on the web 60 and an area 178 in which other printed matter such as text may be located.

Referring to FIG. 2, light that is reflected from the surface of the moving web 60 passes through the lens 168, the filter 166, a second branch 180 of the fiber optic cable, and is detected by a detector 182, such as a photodiode. The detector 182 generates a reflectance signal having a current magnitude that is representative of the amount of reflected light it detects. The reflectance signal is transmitted to a plurality of signal-conditioning circuits including a current-to-voltage (I/V) converter 184, an amplifier 186, a level shift circuit 188, and a variable gain amplifier 190. The level shift circuit 188 is connected to a D/A converter 189, and the variable gain amplifier 190 is connected to a D/A converter 191. As described below, the level shift circuit 188 and the variable gain amplifier 190, which are controlled by a pair of multi-bit digital signal input lines 116*a*, 116*b* connected to the D/A converters 189, 191, respectively, convert the reflectance signal into a normalized reflectance signal having a predetermined range with a predetermined minimum value and a predetermined maximum value.

The normalized reflectance signal is continuously transmitted from a conventional driver circuit 192 to the A/D converter 103 via a line 116*c*. The normalized reflectance signal is also transmitted via a line 194 to a comparator circuit composed of a pair of comparators 196, 198. Each of the comparators 196, 198 is connected to receive a programmable threshold signal that is output from one of a pair of digital-to-analog (D/A) converters 200, 202. Each of the D/A converters 200, 202 converts a multi-bit digital signal received from the microcontroller 200 via one of a pair of multi-bit digital signal lines 116*d*, 116*e* into an analog signal having a corresponding value.

The threshold signals generated by the D/A converters 200, 202 are centered about a baseline value which corresponds to the reflectivity of the web 60 which has substantially no printed matter thereon. In particular, the threshold signal output by the D/A converter 200 is set a predetermined amount above the baseline value and the threshold signal output by the D/A converter 202 is set a predetermined amount below the baseline value. Consequently, the comparator 196 detects the presence of a registration mark printed in a color that is substantially lighter, or more reflective, than the background color of the web 60, and the comparator 198 detects the presence of a registration mark printed in a color that is substantially darker, or less reflective, than the background color of the web 60.

The operation of each of the scanners 114, 144 is controlled by a scanning routine 250 implemented in a computer program executed by each of the station controllers 100, 130. Although the scanning routine 250 is described below in connection with the scanner 114, it should be understood that an identical scanning routine is performed to control the operation of the scanner 144.

Figure 4:
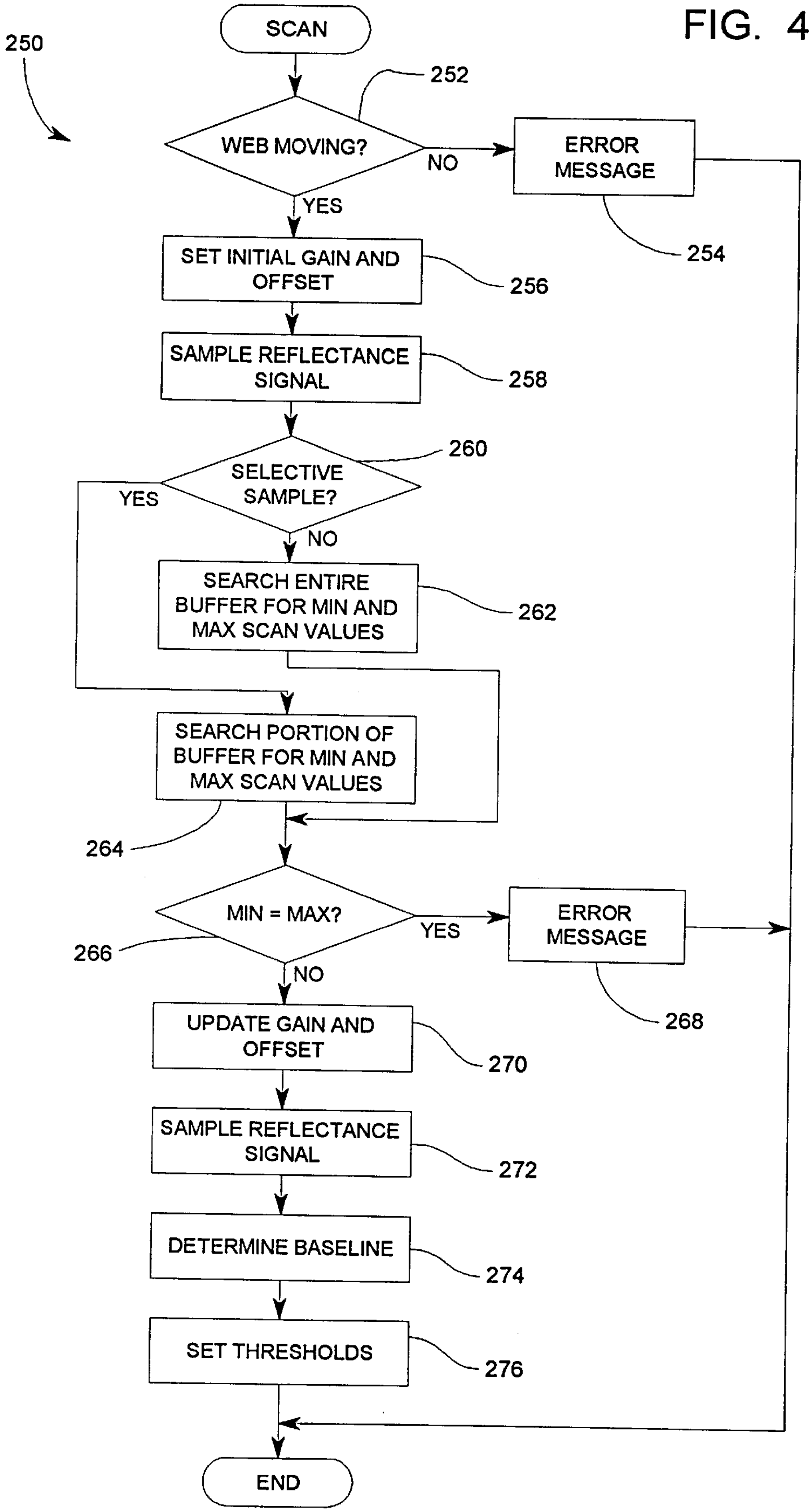
FIG. 4 is a flowchart of a scan routine performed by each printing station controller of the printing press.

A flowchart of the scanning routine 250 is illustrated in FIG. 4. The scanning routine 250 may be performed in response to a scan request sent by the main controller 150 or it may be automatically performed periodically by each controller 100, 130 during operation of the printing press 10.

Referring to FIG. 4, at step 252, if the web 60 is not moving, the program branches to step 254 to generate an appropriate error message since the scanning routine 250 is designed to be performed only when the web 60 is moving. Whether or not the web 60 is moving can be determined, for example, by checking to determine whether the count output generated by the counter 104 is changing.

At step 256, a gain command is sent to the variable gain amplifier 190 in the scanner 114 via the line 116*b* to set the gain of the amplifier 190 to a predetermined initial value. At step 256, an offset command is sent to the level shift circuit 188 in the scanner 114 via the line 116*a* to set the offset level of the circuit 188 to an initial value, which may be a minimum offset level, for example.

At step 258, the output of the A/D converter 103 in the scanner 114 is sampled at a relatively high rate to generate a plurality of binary scan values, each of which has a binary value corresponding to the magnitude of the analog value of the reflectance signal when the A/D converter 103 was read.

The output of the A/D converter 103 may be read each time the shaft encoder sensor 120 generates a new pulse, and the scan values may be stored in a portion of the memory of the microcontroller 102 organized as an indexed buffer, each scan value being stored in an indexed location in the buffer, with the index being equal to the count of the counter 104. A portion of such an indexed buffer is illustrated in FIG. 5A. Referring to FIG. 5A, the left-hand column indicates the numeric value of the index, and the right-hand column stores the numeric scan value.

In the event that the operational speed of the A/D converter 103 is not fast enough to sample the reflectance signal each time the shaft encoder 120 generates a pulse, the current scan value could be repeated in the indexed buffer until the next scan value was determined by the A/D converter 103, as illustrated in FIG. 5B.

The size of the indexed buffer could be made large enough to store scan values corresponding to the entire repeat length of the moving web 60. Referring to FIG. 3, the repeat length of the web 60, which is the same as the circumference of the printing cylinders used in the printing press 10, corresponds to the distance between a pair of dotted lines 257, 259.

The sampling rate of the reflectance signal by the A/D converter 103 should be set high enough so that the registration marks printed on the web 60 are detected. Referring to FIG. 6, the magnitude (in volts) of a portion of an exemplary reflectance signal is shown to have a baseline level, a first peak 261 corresponding to a first registration mark and a second peak 263 corresponding to a second registration mark of a different color. In this case, a sample of the reflectance signal should be taken at each point in time indicated by a small "x," or more frequently. If the samples are taken less frequently, it should be noted that the change in voltage corresponding to the registration mark may be completely missed by the A/D converter 103.

Referring back to FIG. 4, after the reflectance signal is sampled and the scan values are stored in the buffer, the program branches to step 260. Steps 260–270 are performed to determine an automatic adjustment of the gain of the variable gain amplifier 190 and the offset level of the level shifting circuit 188. These adjustments are made based upon the scan values corresponding to the entire repeat length of the web 60, or based upon the scan values corresponding to a predetermined length of the web 60, defined by a start location and a stop location (which may be specified by a pair of start and stop counts generated by the counters 104, 134), in which one of the registration marks is printed.

An example of such a predetermined web length is shown in FIG. 3 as the time period or window defined by a start location which coincides with a dotted line 265 and a stop location which coincides with the dotted line 259. It should be noted that "position" of the window is in a predetermined relationship relative to one or more of the registration marks 172*b*, 174*b*, 176*b*, such as centered about the registration marks. Alternatively, a separate window could be provided for each registration mark.

Referring to FIG. 4, at step 260, if the adjustments to the gain and offset level are to be made based upon the scan values corresponding to the entire repeat length of the web 60, the program branches to step 262, where the entire contents of the indexed buffer described above are searched to locate the scan value having the maximum value and the scan value having the minimum value.

If the adjustments to the gain and offset level are to be made based upon the scan values corresponding to a particular web length or window less than the entire repeat length as determined at step 260, the program branches to step 264 where the contents of the indexed buffer which correspond to that predetermined web length or window are searched to locate the scan value having the maximum value and the scan value having the minimum value.

At step 266, the minimum and maximum scan values retrieved at one of steps 262, 264 are compared with each other. If the minimum scan value is the same as the maximum scan value, an error message is generated at step 268, and the scanning routine 250 ends.

At step 270, a new gain value and a new offset value are determined to convert the reflectance signal into a normalized reflectance signal having a predetermined signal range with a predetermined minimum value and a predetermined maximum value. The new gain value is determined so that the reflectance signal occupies a predetermined target span, such as the span between one volt and nine volts. When the normalized reflectance signal occupies that span, the minimum value of the reflectance signal is one volt and the maximum value of the reflectance signal is nine volts. The new gain value is determined based on the following equation:

$$\text{Target Span}=\text{Gain}\times(\text{Max}-\text{Min})\times\text{Factor},$$

where Target Span is the numeric value of the difference between the upper limit of the span and the lower limit of the span, where Gain is a gain value from which the new gain value is determined, where Max is the binary value of the scan value in the indexed buffer having the greatest magnitude, where Min is binary value of the scan value in the indexed buffer having the smallest magnitude, and where Factor is a conversion factor that converts the difference between the binary values Min and Max to an analog value. For example, for an eight-bit A/D converter (which has 256 possible binary outputs) having an analog input range between zero and ten volts, the conversion factor would be 10/256, or 0.039 volts per binary output.

For example, assume for the above eight-bit A/D converter that Max has a binary value of 77 and Min has a binary value of 26. Using the conversion factor of 0.039 volts/binary output, the analog value of Max would be 3.00 volts and the analog value of Min would be 1.01 volts.

The above equation can be rearranged as the following equation to solve for the value of Gain:

$$\text{Gain}=\text{Target Span}/[(\text{Max}-\text{Min})\times\text{Factor}]$$

For the values of Min, Max and the target span of eight volts noted above, the gain would be $8/[51\times0.039]$, or 4.0. At step 270, the new gain value is determined by multiplying Gain by the current gain value (transmitted to the amplifier 190 at step 256).

A new offset level is then determined at step 270 by determining the amount by which the reflectance signal needs to be vertically shifted so that, after it is amplified in accordance with the new gain value, it occupies the desired target range. The necessary offset may be determined in accordance with the following equation:

$$\text{Offset}=\text{Low Limit}/\text{Gain}-(\text{Min}\times\text{Factor}),$$

where Offset is the offset, Low Limit is the numeric value of the lower limit of the desired target range, and Min, Factor and Gain are defined above.

After the new gain value and offset command are determined as described above, the new gain value is transmitted in digital form to the variable gain amplifier 190 via the line 116*b* connected to the D/A converter 191, and an offset command that would produce the calculated offset is transmitted in digital form to the level shift circuit 188 via the line 116*a* connected to the D/A converter 189.

At step 272, the normalized reflectance signal generated with the new gain and offset commands is sampled by the A/D converter 103 in the same manner as described above in connection with step 258, with the previous scan values stored in the indexed buffer being overwritten by the new scan values..

At step 274, a baseline value which corresponds to the reflectivity of a portion of the moving web 60 which has substantially no printed matter thereon is determined. To determine the baseline value, the scan values in the indexed buffer that were generated from the portion of the web 60 within the window (between the lines 259 and 265 in FIG. 3) are assigned to one of a predetermined number of overlapping numeric ranges. As shown in FIG. 7, each range may encompass ten counts of the A/D converter 103. It should be understood that FIG. 7 illustrates only some of the ranges, and that the ranges would encompass all possible outputs of the A/D converter 103.

After all the scan values have been assigned to one of the ranges, the range with the largest number of scan values assigned thereto is selected as the baseline range, and a baseline signal is determined based on the numeric endpoints of that range. For example, the baseline range shown in FIG. 7 would be the range 95–104 since it has the greatest number (12) of scan values between the lower endpoint 95 of the range and the upper endpoint 104 of the range. The baseline value is determined by determining the average range value of the baseline range, which in this case is (95+104)/2, or 1.00 (which corresponds to an analog voltage of 3.9 volts based on the 0.039 conversion factor described above).

The reason why the baseline value determined at step 274 may correspond to the reflectivity of a portion of the moving web 60 which has substantially no printed matter thereon is described in connection with FIG. 3. Referring to FIG. 3, assume that most of the width, along the scanning path 170, of the window between the lines 259 and 265 is composed of a white background, and that the registration marks 172*b*, 174*b*, 176*b* have a relatively small combined width. In that case, when the window is scanned across the scanning path 170, most of the scan values (e.g. 70%) will correspond to the white background, and a minority of scan values (e.g. 30%) will correspond to the registration marks. Consequently, when the scan values are assigned to the scan value ranges shown in FIG. 7, the range having the largest number of scan values will correspond to the reflectivity of the white background.

Referring to FIG. 4, at step 276, a pair of threshold values are then determined based on the baseline value. A relatively high threshold value is set a predetermined amount above the baseline value, such as 0.75 volts above the baseline value, and a relatively low threshold value is set a predetermined amount below the baseline value, such as 0.75 volts below the baseline value. The high and low threshold values are then transmitted to the D/A converters 200, 202 in binary form via the lines 116*d*, 116*e*, respectively.

FIG. 8 illustrates a reflectance signal 280 having a positive peak 282 and a negative peak 284. The reflectance signal 280 would be generated by scanning a web 60 having an intermediate-colored background (such as grey) on which a lighter-colored registration mark (such as white) and a darker-colored registration mark (such as black) were printed. Since the magnitude of the reflectance signal is proportional to the amount of light reflected (and since lighter colors reflect more light than darker colors), the positive peak 282 would be generated in response to scanning the lighter-colored registration mark, and the negative peak 284 would be generated in response to scanning the darker-colored registration mark. The middle portions of the reflectance signal 280 would be generated in response to scanning the intermediate-colored. background of the web 60.

The high threshold generated by the D/A converter 200 is illustrated by a dotted line 286, and the low threshold generated by the D/A converter 202 is illustrated by a dotted line 288. Referring to FIGS. 2 and 8, when the magnitude of the reflectance signal 280 is between the thresholds 286, 288, the output of both comparators 196, 198 is a low voltage, or logic "0," since the magnitude of the reflectance signal provided to the positive input of the comparator 196 is not greater than the high threshold 286 provided to the negative input of the comparator 196, and since the magnitude of the reflectance signal provided to the negative input of the comparator 198 is not less than the low threshold 288 provided to the positive input of the comparator 198.

When the leading edge of the positive peak 282 of the reflectance signal surpasses the high threshold 286, the output of the comparator 196 will change from logic "0" to logic "1."That transition, which is transmitted to an OR gate 290 and a conventional driver circuit 292 and then to an edge detector (not shown) in the microcontroller 102 via a line 116*f*, indicates to the microcontroller 102 that a registration mark has been detected. The time at which the registration mark is detected is used to dynamically maintain the registration of the printing cylinders in a conventional manner which is not germane to this invention.

When the leading edge of the negative peak 284 of the reflectance signal drops below the low threshold 288, the output of the comparator 198 will change from logic "0" to logic "1." That transition is transmitted to the microcontroller 102 through the OR gate 290 and the driver circuit 292 via line 116f and indicates to the microcontroller 102 that a registration mark has been detected.

A pair of feedback resistors 294, 296 could optionally be connected to the comparators 196, 198 to provide conventional hysteresis so that when the output of one of the comparators 196, 198 transitions from logic "0" to logic "1," the condition being tested by the comparator is easier to satisfy.

In view of the foregoing description, it should be understood that the comparator 196 detects the occurrence of registration marks that are in a lighter color than the web 60, while the comparator 198 detects the occurrence of registration marks that are in a darker color than the web 60. The OR gate 290 is used so that the detection of both lighter colored and darker colored registration marks is communicated to the microcontroller 102.

Although the scanning apparatus described above is implemented with a station controller for each printing station and a main controller connected to each of the station controllers, the scanning apparatus could be implemented with a single controller.

Modifications and alternative embodiments of the invention will be apparent to those skilled in the art in view of the foregoing description. This description is to be construed as illustrative only, and is for the purpose of teaching those skilled in the art the best mode of carrying out the invention.

The details of the structure and method may be varied substantially without departing from the spirit of the invention, and the exclusive use of all modifications which come within the scope of the appended claims is reserved.

What is claimed is:

1. An apparatus for scanning colored registration marks printed on a moving web by a plurality of printing cylinders of a printing press, said printing cylinders having a printing cylinder circumference, said apparatus comprising:

a photoemitter for generating a beam of light directed at a moving web having a plurality of registration marks printed thereon;

a detector for detecting an amount of light reflected from said moving web and generating a reflectance signal having a magnitude relating to said amount of light, said reflectance signal having a signal level;

a variable gain amplifier operatively coupled to said detecting means for amplifying said reflectance signal, said amplifier having a variable gain;

a level shift circuit for shifting the signal level of said reflectance signal;

control means coupled to said variable gain amplifier and said level shift circuit for controllably adjusting said variable gain and said variable offset amount to transform said reflectance signal into a normalized reference signal having a predetermined signal range defined by a predetermined minimum value and a predetermined maximum value;

means for determining a baseline level of said normalized reflectance signal, said baseline level corresponding to the reflectivity of a portion of said moving web having substantially no printed matter thereon;

means for comparing said normalized reflectance signal with a first threshold and a second threshold to generate at least one detect signal indicating detection of one of said registration marks printed on said moving web, each of said first and second thresholds having a magnitude based upon said baseline level, said control means comprising:

means for periodically sampling said reflectance signal at a sampling rate to generate a number of scan values corresponding to a length of said moving web, said length being at least as large as said printing cylinder circumference and said sampling rate being high enough to detect said reference marks, each of said scan values having a magnitude corresponding to the magnitude of said reflectance signal when said reflectance signal was sampled by said sampling means, one of said scan values having a maximum value and one of said scan values having a minimum value;

memory means for storing said scan values; and means for adjusting said signal level and said variable gain and based upon said one scan value having a maximum value and said one scan value having a minimum value.

2. An apparatus as defined in claim 1 wherein said detector comprises a photodiode.

3. An apparatus as defined in claim 1 wherein said means for determining a baseline level of said normalized reflectance signal comprises:

means for assigning each of said scan values to one of a plurality of predetermined ranges;

means for determining a baseline range from said plurality of said predetermined ranges, said baseline range having the largest number of said scan values; and means for determining said baseline level based upon said baseline range determined by said determining means.

4. An apparatus as defined in claim 1 wherein said comparing means comprises:

a first comparator that compares said normalized reflectance signal with said first threshold; and a second comparator that compares said normalized reflectance signal with said second threshold.

5. An apparatus as defined in claim. 1 wherein said sampling means comprises an analog-to-digital converter.

6. An apparatus for scanning colored registration marks printed on a moving web, said apparatus comprising:

a photoemitter for generating a beam of light directed at a moving web having a plurality of registration marks printed thereon;

a detector for detecting an amount of light reflected from said moving web and generating a reflectance signal having a magnitude relating to said amount of light;

means for periodically sampling said reflectance signal to generate a number of scan values;

memory means for storing said scan values; and means for determining a baseline level of said reflectance signal, said baseline level corresponding to the reflectivity of a portion of said moving web having substantially no printed matter thereon.

7. An apparatus as defined in claim 6 wherein each of said scan values has a magnitude corresponding to the magnitude of said reflectance signal when said reflectance signal was sampled by said sampling means, and wherein said means for determining a baseline level comprises:

means for assigning each of said scan values to one of a plurality of predetermined ranges of values based on said magnitudes of said scan values;

means for determining a baseline range from said plurality of said predetermined ranges, said baseline range having the largest number of said scan values; and means for determining said baseline level based upon said baseline range determined by said determining means.

8. An apparatus as defined in claim 7 wherein said assigning means comprises means for assigning each of said scan values to one of a plurality of overlapping ranges.

9. An apparatus as defined in claim 7 wherein said assigning means comprises means for assigning each of said scan values to one of a plurality of overlapping ranges of values including a first range of values bounded by an upper value and a lower value and a second range of values bounded by an upper value and a lower value, said lower value of said second range of values being less than said upper value of said first range of values.

10. An apparatus as defined in claim 7 additionally comprising means for comparing said normalized reflectance signal with a threshold signal based upon said baseline level and generating at least one detect signal indicating detection of one of said registration marks printed on said moving web.

11. An apparatus as defined in claim 7 additionally comprising means for comparing said normalized reflectance signal with a first threshold signal and a second threshold signal and generating at least one detect signal indicating detection of one of said registration marks printed on said moving web, said first and second threshold signals being based on said baseline level.

12. An apparatus for scanning colored registration marks printed on a moving web, said apparatus comprising:

a photoemitter for generating a beam of light directed at a moving web having a plurality of registration marks printed thereon;

a detector for detecting an amount of light reflected from said moving web and generating a reflectance signal having a magnitude relating to said amount of light;

means for periodically sampling said reflectance signal to generate a number of scan values;

memory means for storing said scan values; and means for determining a baseline level of said reflectance signal.

13. An apparatus as defined in claim 12 wherein each of said scan values has a magnitude corresponding to the magnitude of said reflectance signal when said reflectance signal was sampled by said sampling means, and wherein said means for determining a baseline level comprises:

means for assigning each of said scan values to one of a plurality of predetermined ranges of values based on said magnitudes of said scan values;

means for determining a baseline range from said plurality of said predetermined ranges, said baseline range having the largest number of said scan values; and means for determining said baseline level based upon said baseline range determined by said determining means.

14. An apparatus as defined in claim 13 wherein said assigning means comprises means for assigning each of said scan values to one of a plurality of overlapping ranges.

15. An apparatus as defined in claim 13 wherein said assigning means comprises means for assigning each of said scan values to one of a plurality of overlapping ranges of values including a first range of values bounded by an upper value and a lower value and a second range of values bounded by an upper value and a lower value, said lower value of said second range of values being less than said upper value of said first range of values.

16. An apparatus as defined in claim 12 additionally comprising means for comparing said normalized reflectance signal with a threshold signal based upon said baseline level and generating at least one detect signal indicating detection of one of said registration marks printed on said moving web.

17. An apparatus as defined in claim 12 additionally comprising means for comparing said normalized reflectance signal with a first threshold signal and a second threshold signal and generating at least one detect signal indicating detection of one of said registration marks printed on said moving web, said first and second threshold signals being based. on said baseline level.

18. An apparatus for scanning colored registration marks printed on a moving web, said apparatus comprising:

a photoemitter for generating a beam of light directed at a moving web having a plurality of registration marks printed thereon;

a detector for detecting an amount of light reflected from said moving web and generating a reflectance signal having a magnitude relating to said amount of light;

a signal conditioning circuit coupled to said detector for changing a parameter of said reflectance signal;

means for periodically sampling said reflectance signal to generate a number of scan values, each of said scan values having a magnitude corresponding to the magnitude of said reflectance signal when said reflectance signal was sampled by said sampling means;

memory means for storing said scan values; and control means coupled to signal conditioning circuit for controllably adjusting said parameter of said reflectance signal based upon said scan values.

19. An apparatus as defined in claim 18 wherein said control means comprises means for controllably adjusting said signal conditioning circuit so that said reflectance signal is converted to a normalized reflectance signal having a predetermined signal range.

20. An apparatus as defined in claim 18 wherein said control means comprises means for controllably adjusting said signal conditioning circuit so that said reflectance signal is converted to a normalized reflectance signal having a predetermined signal range having a predetermined minimum value and a predetermined maximum value.

21. An apparatus as defined in claim 18 wherein one of said scan values has a minimum value and one of said scan values has a maximum value and wherein said control means comprises means for controllably adjusting said parameter of said reflectance signal based upon said one scan value having a minimum value and said one scan value having a maximum scan value.

22. An apparatus as defined in claim 18 wherein said printing cylinders have a printing cylinder circumference and wherein said sampling means comprises means for periodically sampling said reflectance signal for a duration corresponding to a length of said moving web, said length being at least as large as said printing cylinder circumference.

23. An apparatus as defined in claim 22 wherein said sampling means comprises means for periodically sampling said reflectance signal at a sampling rate high enough to obtain reflectance data relating to one of said registration marks.

24. An apparatus as defined in claim 18 wherein said sampling means comprises means for periodically sampling said reflectance signal for a duration corresponding to a predetermined web length.

25. An apparatus as defined in claim 18 wherein said sampling means comprises means for periodically sampling said reflectance signal for a duration corresponding to a predetermined web length defined by a start location and a stop location.

26. An apparatus as defined in claim 18 additionally comprising means for comparing said normalized reflectance signal with a threshold to generate at least one detect signal indicating detection of one of said registration marks printed on said moving web.

27. An apparatus as defined in claim 18 wherein said signal conditioning circuit comprises a variable gain amplifier operatively coupled to said detector for amplifying said reflectance signal.

28. An apparatus as defined in claim 18 wherein said signal conditioning circuit comprises a level shift circuit for shifting the signal level of said reflectance signal by a variable offset amount.

* * * * *